United States Patent [19]
Todd

[11] Patent Number: 5,661,211
[45] Date of Patent: Aug. 26, 1997

[54] PATCH MATERIAL FOR PATCHING HOLES AND CRACKS IN DRYWALL, WOOD, BLOCK, AND CEMENT AND THE LIKE, AND METHOD OF MAKING AND DISPENSING THE PATCH MATERIAL

[76] Inventor: Ronald L. Todd, 7802 E. Kimsey La., Scottsdale, Ariz. 85257

[21] Appl. No.: 565,724

[22] Filed: Nov. 30, 1995

[51] Int. Cl.$^6$ ............................. C08K 3/34; C08L 29/04; C08L 83/04; C08L 3/02
[52] U.S. Cl. ............................. 524/503; 524/5; 524/425; 524/445; 524/451; 524/47; 524/837; 524/918; 106/613
[58] Field of Search .................... 524/5, 47, 503, 524/918, 837, 425, 451, 445; 106/613

[56] References Cited

U.S. PATENT DOCUMENTS

| | | | |
|---|---|---|---|
| 3,867,335 | 2/1975 | Reed et al. | 524/452 |
| 4,454,267 | 6/1984 | Williams | 524/43 |
| 4,686,253 | 8/1987 | Struss et al. | 524/43 |
| 5,512,616 | 4/1996 | Podlas | 524/43 |

*Primary Examiner*—Andrew E. C. Merriam
*Attorney, Agent, or Firm*—H. Gordon Shields

[57] ABSTRACT

A patching compound for patching holes in drywall, cement, and the like, includes well known drywall mud material, water, and various other ingredients such as calcium carbonate, gypsum, perlite, mica, talc, clay, starch, cement, and a preservative, such as sorbic acid or a product sold as boroguard ZB. The various ingredients are mixed with water to provide a relatively soft and pliable filler compound. Silicone caulking may also be used for moisture retention, if desired. The compound is place in a dispenser for dispensing, and the dispenser may either be a relatively small dispenser for household use or a relatively large dispenser for commercial and industrial use. For the household use, the dispenser preferably includes a housing having an asymmetrical configuration in which is disposed a piston. The piston moves within the cylinder and is prevented from rotating by the asymmetrical configuration of the cylinder. Rotation of a threaded rod causes the piston to move the compound, as desired. A cap fits onto the cylinder for sealing the compound in the cylinder. For industrial or commercial purposes, a dispenser is preferably a circular cylinder made of heavy paper, or the like, with spiral strips that allow the cylinder to be torn away to expose the compound for use. A cap is also used with the commercial or industrial dispenser.

6 Claims, 1 Drawing Sheet

PATCH MATERIAL FOR PATCHING HOLES AND CRACKS IN DRYWALL, WOOD, BLOCK, AND CEMENT AND THE LIKE, AND METHOD OF MAKING AND DISPENSING THE PATCH MATERIAL

BACKGROUND OF THE INVENTION

1. Field of the Invention

This invention relates to patch material for patching holes and cracks in drywall, wood, block, cement, and related materials, and, more particularly, to the patch material and to the method of making and dispensing the patch material.

2. Description of the Prior Art

There are different types of patching materials for patching holes in drywall and in wood. Typically, different types of spackling or caulking compounds are used for drywall. Wood filler material is used for patching holes in wood, and various types of cement products are used for patching holes in concrete. The present invention provides a single material which may be used for patching holes or cracks in various types of material and which is essentially a nonshrinking product. One of the problems with the prior art is the fact that shrinkage occurs, and the shrinkage may be substantial, depending upon the size of the hole or crack to be patched.

U.S. Pat. No. 499,710 (Bronson) discloses a finish for plaster material which includes lime, gypsum, white sand, soapstone, which is a talc product, and kaolin. Various proportions are given in the patent. Water is added to form a pasty mass, and then alum and borax are added. The mixture is dried, and calcine, gypsum or plaster of paris and white sand is added and allowed to dry.

U.S. Pat. No. 816,532 (Covington) discloses another composition which is referred to as both fireproof and waterproof. The composition includes burnt gypsum, mica, silica, graphite, and mica-schist. Several different mixes are illustrated.

U.S. Pat. No. 903,017 (Spackman et al) discloses what is referred to as a plastic composition, or a plaster, which includes hydrated lime, calcium aluminate, alumina, plaster of paris, and blast furnace slag. Different proportions are discussed. Also, sulphate of lime, sulfuric acid, molasses, glue, starch, and other ingredients may be included if desired.

U.S. Pat. No. 2,820,714 (Schneiter et al) discloses a gypsum plaster compound. The compound includes sulphates of aluminum, sodium acid, and potassium aluminum and lime and calcine gypsum. Other ingredients, such as limestone, diatomaceous earth, clay, silica flour, perlite, and dead burnt gypsum may also be added. Different compositions are discussed and explained.

U.S. Pat. No. 3,892,453 (Williams) discloses what is identified as an asbestos-free joint compound. The compound is used to finish joints between wall boards. Broadly identified, the compound includes a filler, a binder, water holding agents, a slip-inducing colloid, and a non-swelling clay. Different examples are given, which include calcium carbonate, polyvinyl alcohol, hydroxyethylcellulose, mica, sodium carboxymethyl cellulose, attapulgus clay, and other elements. Several different examples are given of the compound.

U.S. Pat. No. 4,287,103 (Francis et al) discloses a joint composition which includes a starch. The composition is used to hide the joints of wallboard panels and includes a filler, binder, bulking agents, starches, and water retention agents. Again, different ingredients are listed, including limestone, gypsum, mica, diatomaceous earth, aluminum silicate, propylated dense starch, attapulgus clay, polycrylate, ethylene vinyl, acetatecopolymer, hydroxypropyl methyl cellulose, sodium carbonate, defoaming agents, and preservatives. Several different compositions are illustrated and discussed.

Different types of applicators for dispensing materials relating to the filling of cracks or holes or the like, have been suggested in the prior art. Examples of such are found in U.S. Pat. No. 1,531,245 (Ozanne), in U.S. Pat. No. 1,762,782 (Jepsen), in U.S. Pat. No. 2,804,767 (Schoen), in U.S. Pat. No. 2,819,556 (Pompa), in U.S. Pat. No. 4,637,746 (Vierkotter), and in U.S. Pat. No. 4,884,913 (Smith and Kautman).

The '245 Patent discloses a dispensing nipple secured to a tube. Squeezing the tube causes material to flow out of the nipple. Different configurations of nipples are illustrated.

The '782 Patent discloses a cement or adhesive compound formed into a cylindrical body and placed in a relatively thin and soft metal casing which is spirally corrugated. A cap of relatively stiff material is placed over the casing. The casing and material is easily cut for use, and the cap may then be screwed onto the casing and material from where the cut was made. The encased material, with the cap, is shipped in cardboard tubes.

The '767 Patent discloses a gun type of trowel secured to the end of a caulking gun. Different configurations of the trowel are disclosed. Actuating the caulking gun causes the caulking compound to flow out of the trowels in the desired configuration.

The '556 Patent discloses a holder and dispenser apparatus for a soluble product, such as a bar of soap. The lower portion of the bar of soap, or the like, is exposed at the bottom of the dispenser, and a moistened hand, or the like, is simply rubbed across the bottom of the soap to dispense the soap, or whatever the soluble product is.

The '746 Patent discloses a dispensing container for multicomponent adhesives in which the proper proportions of the ingredients are dispensed for proper mixing. The ingredients are kept separate in the container until they are dispensed. A panel separates the two ingredients, and a piston is movable downwardly to dispense the ingredients in the proper proportions. The proportions are determined by the relative sizes of adjacent chambers.

The '913 Patent discloses a plurality of absorbent pads held together by a tear away adhesive strip of material. The pads are successively removed from the container in which they are disposed.

SUMMARY OF THE INVENTION

The invention described and claimed herein comprises a filler compound for filling holes in plaster board, wood, block, cement, and the like, and dispensers for the filler material, and a method of making the filler material. Different types of dispensers are disclosed, including a relatively small dispenser for home use application, and a relatively larger dispenser for industrial or commercial purposes. The dispensers include seals to help insure relatively long shelf life. Different formulations are disclosed, depending on the desired application. The beginning ingredients for the product include common drywall premixed material or cement, depending on the particular application, and then other materials such as calcium carbonate, gypsum, perlite, mica, talc, clay, and starch, with water, and, for different applications, silicone caulking compound, and cement additive, may be added, and zinc borate is added as a preservative, or else sorbic acid may be added as a preservative. A preservative is added to provide a relatively long shelf life.

Among the objects of the present invention are the following:

To provide new and useful filler material;

To provide new and useful filler material including drywall premix, and various combinations of ingredients such as calcium carbonate, gypsum, perlite, mica, talc, clay, and starch;

To provide dispenser apparatus for dispensing filler materials for holes and cracks;

To provide new and useful method of making material for patching holes and cracks; and To provide new and useful patching material for holes and cracks in which the patching material has minimal shrinkage and maximum shelf life.

DESCRIPTION OF THE PREFERRED EMBODIMENT

Figure 1:
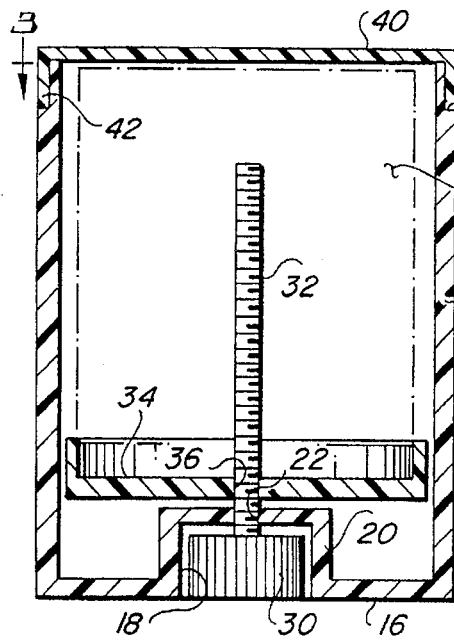
FIG. 1 is a perspective view of a dispenser for patch material of the present invention.
Figure 2:
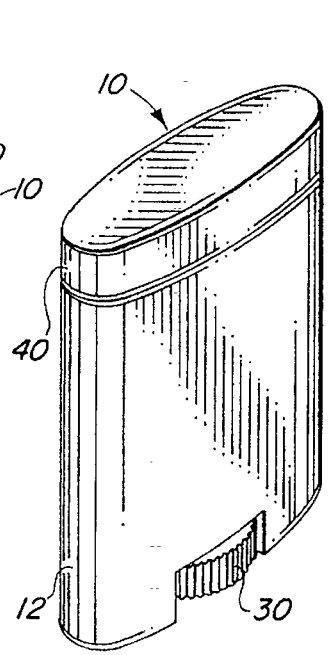
FIG. 2 is a view in partial section of the apparatus of FIG. 1.
Figure 3:
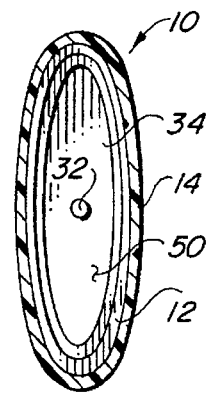
FIG. 3 is a view in partial section taken generally along line 3—3 of FIG. 2.

FIG. 1 is a perspective view of container apparatus 10 of the present invention. FIG. 2 is a view in partial section of the container apparatus 10 of FIG. 1. FIG. 3 is a top view of the container apparatus 10 taken generally along line 3—3 of FIG. 1. For the following descriptive material, reference will primarily be made to FIGS. 1, 2, and 3.

The patching compound of the present invention is disposed within a container 10, which is a generally oval configured container, as best shown from FIGS. 1 and 3. The container or dispenser 10 comprises an oval shaped cylinder having a top shoulder 14 on which is disposed a cap 40. The cylinder 12 also includes a bottom 16, with a recess extending upwardly from the bottom 16. The recess is generally cylindrical or circular in configuration, and includes a bottom recess wall 18 and a top recess wall 20. An aperture 22 extends through the top recess wall 20. The aperture 22 is centrally located with respect to the recess wall 20.

Disposed within the recess 20 is a rotating disk 30 which is secured to a threaded rod 32. The threaded rod 32 extends through the aperture 22.

A piston 34 is disposed within the oval shaped cylinder housing 12. The configuration of the cylinder 12, which is noncircular, prevents the piston from rotating as the threaded rod 32 rotates. The threaded rod 32 extends through a mating threaded aperture 36. Accordingly, rotation of the disk 30, and the threaded rod 32, causes the piston 34 to move upwardly and downwardly. A chamber 50 is defined within the housing 12 and above the piston 34. When the patching compound of the present invention is inserted within the chamber 50, the compound moves upwardly and downwardly with the piston 34 in response to rotation of the disk 30 and its threaded rod 32.

A cap 40 is shown in FIGS. 1 and 2 disposed on the top shoulder 14 of the cylinder housing 12. The cap 40 includes a downwardly extending wall or flange 42 which is disposed on the shoulder 14.

The compound disposed within the chamber 50, and on the piston 34, needs to be protected as much as possible from air which will cause the compound to harden prematurely. Accordingly, to provide a maximum shelf life, a preservative is included in the compound, and will be discussed in detail below, and different types of seals may be used to secure the cap 40 to the cylinder housing 12. In FIGS. 2 and 3, a simple frictional engagement between a downwardly extending flange 42 of the cap 40 is shown fitted onto a shoulder 14 of the cylinder 12. In FIGS. 4A, 4B, 4C, and 4D, other configurations of seals are shown. For the following discussion, reference will be made successively to FIGS. 4A, 4B, 4C, and 4D.

Figure 4A:
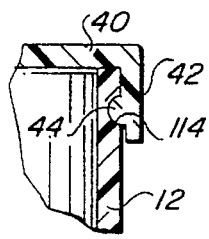
FIGS. 4A, 4B, 4C, and 4D are fragmentary views of alternate embodiments of sealing elements usable with the apparatus of the present invention.

In FIG. 4A, the dispenser housing or cylinder 12 is shown with a recess 114, and the downwardly extending flange 42 of the cap 40 is shown with a ridge 44 which extends into the groove 114. The groove 114 is circumferencially extending about the cylinder 12.

Figure 4B:
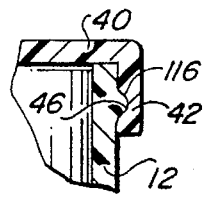
Figure 4C:
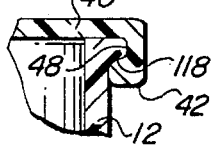

In FIG. 4B, the cylinder 12 is shown with a ridge 116 which extends outwardly from the upper portion of the cylinder, and extends all the way around the housing, circumferencially. The downwardly extending flange 42 of the cap 40 includes a groove 46 which receives the ridge 116. Thus, essentially, FIGS. 4A and 4B are opposites of each other, with the element in FIG. 4A which includes the groove having the ridge in 4B, and the element having the ridge in 4A having the groove in 4A. In FIG. 4C, the upper portion of the cylinder 12 includes an outwardly extending lip 118, and the cap includes a recess or groove 48 at the juncture of the top of the cap and the downwardly extending flange 42.

It will be noted, in all cases, that both the cylinder 12 and the cap 40 are made of plastic materials which have a degree of elasticity, which enable them to move as necessary required to allow for the mating of the various seal elements involved.

Figure 4D:
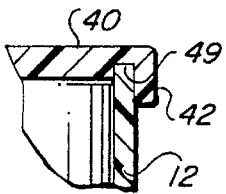

In FIG. 4D, the cylinder wall 12 comprises a generally straight wall, while the cap 40 includes a groove 49 at the juncture of the top of the cap 40 and the downwardly extending flange 42 which is disposed over the top of the wall. The width of the groove or slot 48 is substantially the same as the thickness of the cylinder wall 12 so that a relatively tight fit is accomplished when the cap 40 is pressed onto the cylinder 12.

Figure 5:
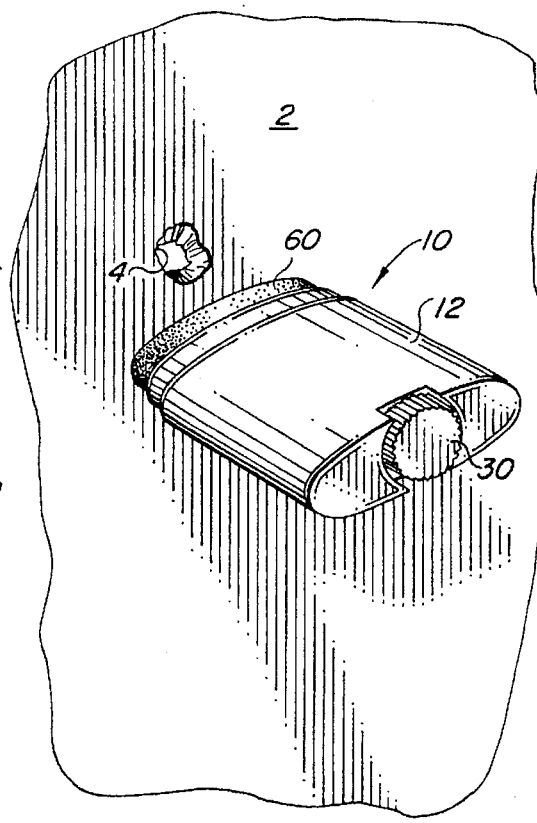
FIG. 5 is a perspective view showing the apparatus of FIG. 1 in the use position adjacent to a hole to be filled.

FIG. 5 comprises a perspective view of a portion of a wall 2 which includes a hole 4. The wall may be wall board, wood, clock, cement, or virtually anything with a hole or crack to be patched. While the term "wall" is used for illustrative purposes, the "wall" may be a ceiling, a floor, or virtually any other surface in need of patching. The dispenser apparatus 10 of the present invention is shown adjacent to the hole 4, with compound 60 extending outwardly from the top or upper portion of the cylinder 12. The compound 60 is moved slightly out of the cylinder 12 by rotation of the disk 30, as described above.

The dispenser 10 is simply held adjacent to the hole 4, with the compound 60 pressed into the hole 4 and wiped away. The plaster board 2 may then be scraped or wiped smooth, with the excess compound 60 outside of the hole 4 wiped away. The compound 60 is a relatively quick drying compound as discussed below, and may soon be appropriately sanded, sponged, painted, etc. Note the use of the term "sponged." For many applications, the user need only use a sponge, rather than a putty knife or the like.

Figure 6:
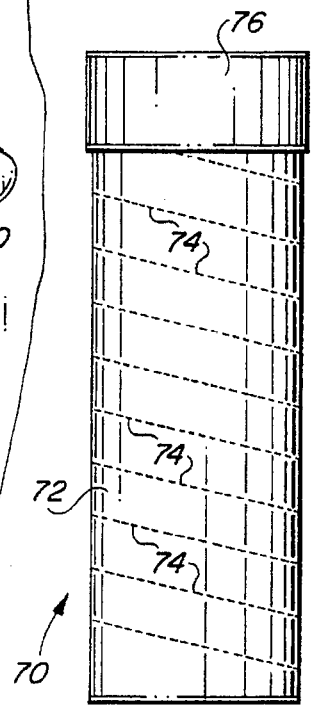
FIG. 6 is a plan view of another container apparatus for the filler material of the present material.

The dispenser 10 is preferably a container holding a relatively small amount of compound 60 designed for use by a home owner who has only occasional use for the filler compound 60. On the other hand, for commercial application, a larger container is necessary. Such a commercial type container is illustrated in FIG. 6. FIG. 6 comprises a plan view of a dispenser 70 which includes a generally cylindrical, closed bottom housing 72. The cylindrical housing 72 includes appropriate spiral perforations 74, or the like, which may be used to tear away portions of the cylinder 72 to expose the compound 60 (not shown).

In place of the spiral perforations 74, a spiral string, or the like, following the same configuration as the perforations 74 may be used. The idea is simply that portions of the cylinder, preferably made of a heavy paper, or the like, are torn away to expose the compound. There is no piston arrangement with the dispenser 70, as there is with the dispenser 10. Rather, the cylinder 72 is simply torn away to expose a compound for use in an industrial or commercial application. A cap 74 is disposed on the top of the cylinder 72. A cap such as illustrated in FIG. 4D may be most appropriate for use with the dispenser 70.

The patch material dispensed by the dispensers is made in bulk and is packaged for the appropriate end usage, either in a commercial package, as illustrated in conjunction with FIG. 5, and discussed in conjunction therewith, or for a homeowner, in which case the dispenser is as best illustrated in conjunction with FIGS. 1–5, and discussed in conjunction therewith.

The patch material is made or mixed differently, depending on the desired use. Several examples are set forth below.

EXAMPLE NO. 1

The beginning ingredients are fifty pounds of pre-mixed drywall mud. It is mixed with about 2 pounds of zinc borate and about two gallons of water. The drywall mud is a commercial, well known, mixture, and, contains primarily calcium carbonate and water, or with the calcium carbonate being replaced by gypsum. Other ingredients which may be in the drywall mud include mica, talc, perlite, polyvinyl acetate, polyvinyl alcohol, clay, and starch, in relatively small amounts or percentages. The drywall mud, zinc borate, and water are mixed together in one container.

The calcium carbonate or gypsum range between thirty percent (30%) and eighty five percent (85%) by weight, and the water between twenty five percent (25%) and fifty percent (50%) by weight. The mica varies between zero percent (0%) and twelve percent (12%) by weight, and the talc and perlite each vary between zero percent (0%) and ten percent (10%) by weight, and the other ingredients are typically a maximum of one percent (1%) by weight.

A second container containing about twenty-two pounds of a mixture of calcium carbonate or gypsum, magnesium silicate hydrate, perlite, mica, talc, polyvinyl acetate, polyvinyl alcohol, clay, starch, and ethylene glycol, are mixed with about one and one half gallons of water.

The calcium carbonate may range between about twenty percent (20%) to about fifty percent (50%) by weight, and if gypsum is used instead of calcium carbonate, the gypsum typically ranges between about twenty eight percent (28%) and forty seven percent (47%) by weight. The mica typically ranges between zero percent (0%) and six and six tenths percent (6.6%). The magnesium silicate hydrate is about two and four tenths percent (2.4%), the talc ranges between zero percent (0%) and five and five tenths percent (5.5%), the perlite between zero percent (0%) and five and five tenths percent (5.5%), the polyvinyl acetate between zero percent (0%) and three and nine tenths percent (3.9%), the polyvinyl alcohol between zero percent (0%) and one and seven tenths percent (1.7%), the clay between zero percent (0%) and one and seven tenths percent (1.7%), and the starch and ethylene glycol each range between zero percent (0%) and six tenths percent (0.6%). Each of the percentages is, of course, by weight.

The materials in the two containers are then combined and thoroughly mixed together. The mixture is then allowed to settle for about twenty minutes before being put into dispenser containers, either commercial dispensers or containers, as indicated in FIG. 6 of the drawing, or dispensers or containers for home use, as shown in FIGS. 1–5.

EXAMPLE NO. 2

Two containers are mixed as generally described above in Example No. 1. However, about one pound of silicone caulking compound is added to the mud and water container and the silicone caulking compound is mixed in with the mud and water. However, instead of about two gallons of water, about three and one half gallons of water are used for the mud, zinc borate, silicone caulking compound, and water mixture. A second container, as set forth above in Example No. 1, is also mixed, and the two containers are then mixed together. After mixing, the same procedure is followed for filling dispensers as discussed above in Example No. 1.

EXAMPLE NO. 3

For patching holes in cement, instead of using fifty pounds of drywall mud in the first container, about forty pounds of cement is mixed with about two and one half gallons of water, about two pounds of zinc borate, and about ten pounds of lime. A second container is mixed, as discussed above in Example No. 1, and the mixtures in the two containers are then mixed together, all as set forth above. After mixing, as set forth above, the mixed material is appropriately loaded into dispensers, again as discussed above.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. A method of making patch material comprising the steps of:

mixing a first quantity of calcium carbonate, mica, talc, perlite, polyvinyl acetate, polyvinyl alcohol, clay, starch, a preservative, and water in a first container;

mixing a second quantity of calcium carbonate, magnesium silicate hydrate, mica, talc, perlite, polyvinyl acetate, polyvinyl alcohol, clay, starch, ethylene glycol, and water in a second container;

mixing together the mixtures of the first and second containers; and providing a dispenser for receiving the mixed together mixtures.

2. The method of claim 1 in which the step of providing a dispenser comprises providing a cylindrical container for commercial use.

3. The method of claim 1 in which the step of providing a dispenser comprises providing an assymetrical container having a movable piston therein for home use.

4. The method of claim 1 which further includes the step of providing a cap for the dispenser.

5. The method of claim 1 which further includes the step of mixing a quantity of silicone caulk in the first container.

6. The method of claim 1 in which the preservative is zinc borate.

* * * * *